United States Patent [19]

Atherton

[11] 4,036,868
[45] July 19, 1977

[54] NITROGEN-CONTAINING COMPOUNDS AND USE THEREOF

[75] Inventor: John Heathcote Atherton, Manchester, England

[73] Assignee: Imperial Chemical Industries Limited, London, England

[21] Appl. No.: 542,048

[22] Filed: Jan. 17, 1975

Related U.S. Application Data

[63] Continuation-in-part of Ser. No. 329,337, Feb. 5, 1973, abandoned.

[30] Foreign Application Priority Data

Feb. 7, 1972  United Kingdom ............... 5494/72

[51] Int. Cl.$^2$ .............................. C07F 7/10; C07F 7/18
[52] U.S. Cl. ...................... 260/448.2 N; 260/448.2 E; 260/448.8 R
[58] Field of Search ............... 260/448.2 N, 448.8 R, 260/448.2 E

[56] References Cited

U.S. PATENT DOCUMENTS

| 2,823,218 | 2/1958 | Speier et al. | 260/448.2 E |
|---|---|---|---|
| 2,970,150 | 1/1961 | Bailey | 260/448.2 E X |
| 3,033,815 | 5/1962 | Pike et al. | 260/448.2 N X |
| 3,068,153 | 12/1962 | Morehouse | 260/448.2 N X |
| 3,234,178 | 2/1966 | Sellers | 260/448.2 N X |
| 3,402,191 | 9/1968 | Morehouse | 260/448.2 N |

Primary Examiner—Paul F. Shaver

Attorney, Agent, or Firm—Cushman, Darby & Cushman

[57] ABSTRACT

Nitrogen-containing organopolysiloxanes consisting of 0.18 to 14 mole percent of units of the formula (I): OSi(R).$C_dH_{2d}$.$CH_2N(R^{iv})$.Si(R)O, 0 to 0.1 mole percent of units of the formula (II): OSi(R)$NHCH_2C(R''')=CH_2$; and 0 to 50 mole percent of units of the formula (III): OSi(R)$C_dH_{2d}$.$CH_2NH(R^{iv})$, the remaining units being $R_3SiO_{1/2}$ or $R_eH_fSiO_{4-e-f)/2}$, where R is a monovalent hydrocarbon group, R''' is hydrogen or methyl, R$^{iv}$ is hydrogen or alkyl having up to 6 carbon atoms, d is 2 or 3, e is 1 or 2, f is 0 or 1 and e + f is 2; and to organopolysiloxanes having the average general formula:

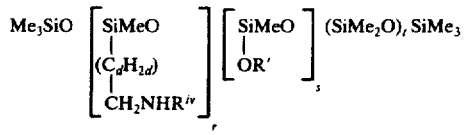

where R' is hydrogen, monovalent hydrocarbon or polyoxyalkylene of the formula $(C_nH_{2n}O)_cR''$ wherein n is 2 or 3, R$^{iv}$ is hydrogen or alkyl having up to 6 carbon atoms, c is an integer of 1 to 30 and R'' is hydrogen or monovalent hydrocarbon, r is a number from 0.1 to 5.0, s is a number from 1 to 4.99, t is a number from 0 to 500 and d is 2 or 3.

16 Claims, No Drawings

NITROGEN-CONTAINING COMPOUNDS AND USE THEREOF

This invention relates to new and useful nitrogen-containing compositions and to the use of such compositions and is a continuation-in-part to application Ser. No. 329337 filed Feb. 5, 1973 now abandoned.

A wide variety of nitrogen-containing compounds are kown to have been used for sundry purposes. Included among such compounds have been organopolysiloxanes having both alkoxy and γ-aminopropyl groups attached to the same or different silicon atoms.

According to the present invention a new and useful class of nitrogen-containing organopolysiloxanes (A) comprises organopolysiloxanes consisting of 0.018 to 14 mole percent of units of the formula (I) $OSi(R)C_dH_{2d}CH_2N(R^{iv})Si(R)O$, 0 to 0.1 mole percent of units of the formula (II) $OSi(R)NHCH_2C(R''')=CH_2$ and 0 to 50 mole percent of units of the formula (III) $OSi(R)C_dH_{2d}CH_2NHR^{iv}$ the remaining units being selected from $R_3SiO_{1/2}$ and $R_eH_f$. $SiO_{(4-e-f)/2}$ units where R is a monovalent hydrocarbon group, R''' is hydrogen or a methyl group, $R^{iv}$ is hydrogen or an alkyl group having up to 6 carbon atoms, d is 2 or 3, e is 1 or 2, f is 0 or 1 and $e + f$ is 2.

It is in general preferred that in our organopolysiloxanes (A) the proportion of the units I, II and III should be 5 to 10, 0 to 0.1 and 0.25 to 10 mole percent respectively.

Our invention also resides in a process for the production of organopolysiloxanes (B) having both aminopropyl or aminobutyl and OR' groups where R' is hydrogen, a monovalent hydrocarbon group, a monovalent hydrocarbon group substituted by NR'' groups, an oxyalkylene group of the general formula $C_nH_{2n}O)_cR''$ where n is 2 or 3 and c is an integer from 1 to 30, or a $NH_2$ group where R'' is hydrogen or a monovalent hydrocarbon group.

These organopolysiloxanes (B) may be represented by the average general formula:

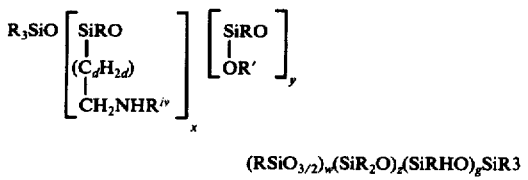

$(RSiO_{3/2})_w(SiR_2O)_y(SiRHO)_gSiR3$ wherein R is a monovalent hydrocarbon radical, and is preferably a methyl group, R' is as hereinbefore defined, w is a number from 0 to 5, x is a number from 0.1 to 5, y is a number from 1 to 49.9, z is a number from 0 to 500 and g is a number from 0 to 48.9, $(w + x + y + g)$ being equal to a in the polysiloxane (C) from which it is derived.

The nitrogen-containing organopolysiloxanes (A) of our invention may be prepared by reacting an allylamine with an organiopolysiloxane containing a proportion of silicon-bonded hydrogen atoms, the reaction being carried out in presence of a catalyst of the kind known for use in the addition reaction between a compound containing silicon-bonded hydrogen and an unsaturated compound. Suitable allylamines are those of the general formula $CH_2=C(R''')CH_2NHR^{iv}$ where R''' is hydrogen or a methyl group and $R^{iv}$ is hydrogen or an alkyl group having not more than 6 carbon atoms. It should be noted however that in the cases where $R^{iv}$ is other than hydrogen units of formula $OSi(R)N(R^{iv})CH_2C(R''')=CH_2$ are not formed.

Organopolysiloxanes suitable for use in this reaction may be of the average general formula:

$R_3SiO(RHSiO)_a(R_2SiO)_zSiR_3$ (C)

wherein the group R is as hereinbefore defined, a is a number from 1 to 50, and z is as hereinbefore defined. Suitable groups R include, for example, methyl, phenyl and 3,3,3-trifluoropropyl groups. For many purposes it is preferred that the groups R be methyl groups. While a and z may vary as stated it is frequently preferred that a has a value from 1 to 10 and that z has a value from 0 to 100.

Suitable catalysts which may be used in the reaction include, for example, bis(diethylsulphide)platinous chloride, chloroplatinic acid, platinum chloride/olefin complexes such as cyclohexene platinous chloride and other forms of platinum catalyst containing combined platinum. It is normally preferred to use a catalyst which is soluble in the reaction mixture. The catalyst is normally used in amount from $10^{-2}$ to $10^{-7}$ moles per mole of SiH. It is, however, generally preferred to use from $10^{-3}$ to $10^{-5}$ moles per mole of SiH.

It is normally convenient to carry out the reaction by heating at, for example, from 30° to 200° C. At lower temperatures the speed of reaction is generally too slow for practical purposes. It is also preferable to carry out the reaction in presence of a solvent, for example, such as toluene, benzene or white spirits, and it is very often convenient to react at the reflux temperature of the reaction mixture. It is also preferred to add the allylamine to the reaction mixture slowly and evenly.

The relative proportions of the allylamine and polysiloxane (C) which are reacted may vary widely depending on the product desired. The amount of the allylamine may or may not be sufficient to react with all of the silicon-bonded hydrogen. It is, however, frequently preferred that the molar proportion of allylamine to silicon-bonded hydrogen should be from 1:1 to 1:2 or thereabouts. It is not necessary to react all of the silicon-bonded hydrogen atoms in the preparation of polysiloxane (A).

The nitrogen-containing organopolysiloxanes (A) of our invention may be used for a variety of purposes such as, for example, treating materials such as silicas and cellulosic materials to render them hydrophobic. They attach to materials containing hydroxyl groups by silylation thereof giving Si—O—C bonds. They are, however, particularly useful as intermediates, especially for the preparation of organopolysiloxanes (B) containing both aminopropyl and OR' groups.

A process of producing organopolysiloxanes (B) according to our invention comprises reacting a nitrogen-containing organopolysiloxane (A) of our invention with water or an organic compound containing OH groups. It is preferred that the nitrogen-containing organopolysiloxane (B) so produced should be free from silicon-bonded hydrogen. Hydroxyl-containing compounds which may be used in this reaction include, for example, water, methanol, ethanol, propanol, butanol, isobutanol, benzyl alcohol, ethylene glycol, propylene glycol, ethanolamine, N,N-diethylethanolamine, N,N-diethylhydroxylamine and compounds of the general formula R"(OC$_n$H$_{2n}$)$_c$OH where R", n and c are as hereinbefore defined.

It is preferred to carry out the reaction between the polysiloxane (A) and the hydroxyl-containing compound in a solvent and this may be the same solvent as used in the preparation of polysiloxane (A). It is also generally preferred to react at the reflux temperature of the mixture. In many cases it is also found desirable to use a catalyst of the kind known for use in the reaction between compounds containing silicon-bonded hydrogen atoms and compounds containing hydroxyl groups. These include, for example, piperidine, diethylhydroxylamine, potassium hydroxide, stannous octoate and zinc octoate.

Among the polysiloxanes (B) which may be so obtained is a new class of the average general formula:

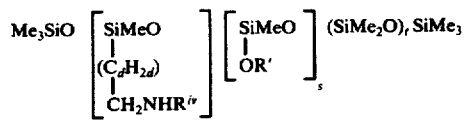

where R, and R' are as hereinbefore defined, r is a number from 0.1 to 5.0, s is a number from 1 to 4.99 and t is a number from 0 to 500. It is frequently preferred that r be from 0.7 to 2.0 and that t be from 0 to 30. These organopolsiloxanes are useful for a wide range of purposes including sizing agents for organic and glass fibres, emulsifying agents, waterproofing agents and other like applications. They are particularly useful for use as polish additives to confer detergent resistance thereon.

Our invention is further illustrated by the following examples in which all parts and percentages are by weight.

EXAMPLE 1

1166.5 parts of a polysiloxane having the average formula Me$_3$SiO(SiMe$_2$O)$_{15}$(SiMeHO)$_{3.1}$SiMe$_3$, 860 parts of toluene and 0.115 part of bis(diethylsulphide)platinous chloride were stirred and heated to reflux. 57 parts of allylamine were added dropwise to the refluxing solution over a period of 6 hours and heating under reflux continued for 1 hour after the addition was complete. Volatile materials were removed by distillation at 100° C under a pressure of 15 mm Hg to give 1220 parts of a pale orange-yellow oil having a viscosity of 53.7 centistokes at 25° C and a neutralisation equivalent of 1665. Quantitative infrared analysis showed that the product contained 42 percent of the silicon-bonded hydrogen present at the start of the reaction. The product was an organopolysiloxane containing the units Me$_3$SiO$_{1/2}$: Me$_2$SiO: OSi(Me)CH$_2$CH$_2$CH$_2$NHSi(-Me)O:MeHSiO: and OSi(Me)NHCH$_2$CH=CH$_2$ in the proportions 1:7.5:0.45:0.65:0.01.

EXAMPLE 2

41.25 parts of the product of Example 1, 21 parts of toluene and 8 parts of propanol were heated under reflux for 5 minutes (no gas was evolved) and the solution then devolatilised at 100° C under a pressure of 15 mm Hg to give a product having a neutralisation equivalent of 1760 and a viscosity of 31.2 cS at 25° C, represented by the average formula

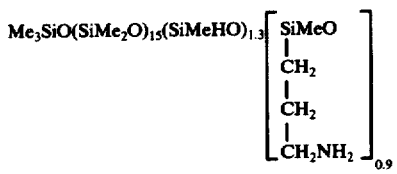

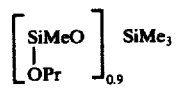

EXAMPLE 3

21.3 parts of a polysiloxane having the average formula Me$_3$SiO(SiMe$_2$O)$_{15}$(SiMeHO)$_{3.14}$SiMe$_3$ 19.6 parts of toluene and 0.002 part of bis(diethylsulphide)platinous chloride were stirred and heated to relux and 1.5 parts of allylamine added to the solution over a period of 2 hours. Infrared analysis showed that 44.5% of the available silicon-bonded hydrogen had been consumed at this stage. A sample was removed, and after devolatilisation at 100° C under a pressure of 15 mm Hg found to have a neutralisation equivalent of 1535. An additional sample was treated with its own volume of methanol, heated to reflux and again devolatilised under identical conditions to give a product having a neutralisation equivalent of 1613. This intermediate product was an organopolysiloxane containing the units Me$_2$SiO$_{1/2}$:Me$_2$SiO:OSi(Me)CH$_2$CH$_2$CH$_2$NHSi(Me)O:MeHSiO:OSi(Me)CH$_2$CH$_2$CH$_2$NH$_2$: and OSi(Me)NHCH$_2$CH=CH$_2$ in the proportions 1:7.5:0.207:0.875:0.267:0.017.

4 parts of volatile materials were removed from the mixture by distillation at 100° C under a pressure of 15 mm Hg and a solution of 0.09 part of stannous octoate in 3.4 parts of propanol added dropwise to the refluxing solution. Heating under reflux was continued for two hours after the addition was complete after which the mixture was allowed to cool to 20° C and filtered. Solvent was removed by distillation at a temperature of 120° C and a pressure of 20 mm Hg to give 22 parts of an oil having a neutralisation equivalent of 1680 and represented by the average formula

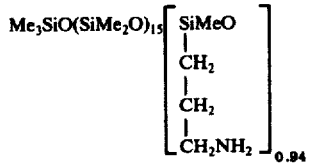

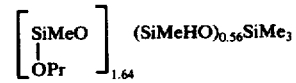

Nitrogen analysis (Kjeldahl) 0.85% Calc. 0.833%. Silicon-bonded hydrogen in the product was measured by quantitative infra-red spectroscopy.

EXAMPLE 4

246 parts of a polysiloxane having the average formula

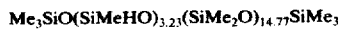

in 162 parts of toluene containing 0.020 part of bis(diethylsulphide) platinous chloride were heated to reflux and 11.6 parts of allylamine added thereto at an even rate during 250 minutes. Thereafter a mixture of 23 parts of propanol and 12 parts of isobutanol containing 0.05 part of potassium hydroxide and 0.33 part of water was added during 35 minutes. Gas evolution ceased 90 minutes after the addition was complete and infra red spectroscopy showed the absence of silicon-bonded hydrogen from the reaction mixture. Volatile materials were removed by distillation at a pressure of 10 mm Hg and a temperature of 100° C to give 250 parts of an oil having a viscosity of 12.7 cS at 25° C and a neutralisation equivalent of 1460.

EXAMPLE 5

878.5 parts of a polysiloxane having the average formula $Me_3SiO(SiMe_2O)_{15}(SiMeHO)_{3.15}SiMe_3$, 860 parts of toluene and 0.09 part of bis(diethylsulphide)platinous chloride were heated to reflux and 53 parts of allylamine added dropwise over a period of 3 hours and after which the mixture was heated under reflux for 3 hours. 770 parts of volatile materials were distilled off at atmospheric pressure. 1 part of stannous octoate, and 59 parts of methanol were added. The mixture was heated under reflux for 2 hours then devolatilised at 130° C and 80 mm Hg pressure to give 916 parts of an orange oil having a neutralisation equivalent of 1620 and a silanic hydrogen content of 0.075 percent. It is represented by the average formula $$MeSiO(SiMe_2O)_{15}(SiMeHO)_{1.16}\begin{bmatrix} SiMeO \\ | \\ OMe \end{bmatrix}_{1.04} \begin{bmatrix} SiMeO \\ | \\ CH_2CH_2CH_2NH_2 \end{bmatrix}_{0.95} SiMe_3$$

Found: N, 0.90%; Calc. N 0.87%.

EXAMPLE 6

467 parts of a polysiloxane having the average formula $Me_3SiO(SiMe_2O)_{15}(SiMeHO)_{3.1}SiMe_3$, 430 parts of toluene and 0.0445 part of bis(diethylsulphide)platinous chloride were heated to reflux and 21 parts of allylamine added dropwise over a period of 8 hours. 2 parts of diethylhydroxylamine and 58 parts of n-propanol were added to the mixture, which was then heated under reflux for a further 3 hours. Volatile materials were removed by distillation at 120° C and 55 mm Hg pressure. The product was a pale yellow oil having a neutralisation equivalent of 2160, and represented by the formula

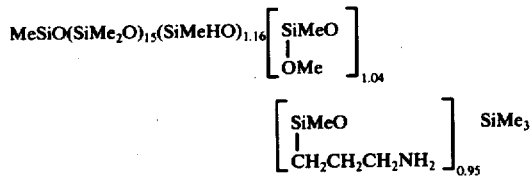

Infrared analysis of the product showed that no silicon-bonded hydrogen remained. 1.4 parts of hydrogen were evolved during the reaction (Theory for product shown: 1.46 parts).

EXAMPLE 7

46.5 parts of a polysiloxane having the average formula $Me_3SiO(SiMe_2O)_{15}(SiMeHO)_3SiMe_3$, 129 parts of toluene and 0.1 part of bis-(diethylsulphide)platinous chloride were heated to reflux and 11.4 parts of allylamine added dropwise over a period of 2 hours. At the end of this time no silicon-bonded hydrogen could be detected in the product by infrared spectroscopy. Solvent was removed by distillation at 100° C and 15 mm Hg pressure to give a rubbery gel. This was dissolved in 100 parts of methanol, after which excess methanol was distilled off to give 45 parts of a dark mobile liquid having a neutralisation equivalent of 1030 and a methoxy content (as OMe) of 2.7%. It is represented by the formula

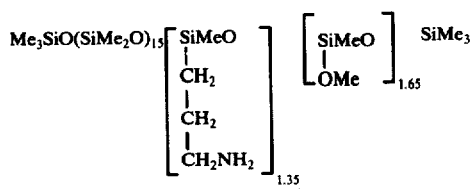

EXAMPLE 8

348 parts of a polysiloxane having the average formula $Me_3SiO(SiMe_2O)_{14.6}(SiMeHO)_{4.4}SiMe_3$, 1290 parts of toluene and 0.8 part of bis(diethylsulphide)platinous chloride were heated to reflux and 53 parts of allylamine added dropwise over a period of 2 hours, after which time no silicon-bonded hydrogen could be detected in the product by infra-red spectroscopy.

The mixture was heated under reflux with 500 parts of methanol for 1 hour and solvent removed by distillation at 190° C and 18 mm Hg pressure to give 363 parts of a dark brown oil having a neutralisation equivalent of 1100 and represented by the average formula

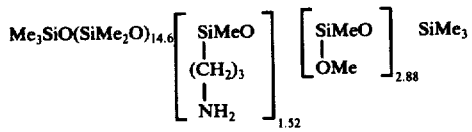

EXAMPLE 9

480 parts of a polysiloxane having the average formula $Me_3SiO(SiMe_2O)_{15}(SiMeHO)_{3.03}SiMe_3$, 430 parts of toluene and 0.045 part of bis(diethylsulphide)platinous chloride were heated to reflux and 38 parts of allylamine added dropwise over a period of 3 hours. 2 parts of diethylhydroxylamine were added to the mixture, followed by 40 parts of methanol after which the mixture was heated under reflux for 5 hours. When hydrogen evolution ceased volatile materials were removed by distillation at 100° C and a pressure of 10 mm Hg to give 500 parts of a pale yellow oil of viscosity 37.3 cS at 25° C having a neutralisation equivalent of 1620 and represented by the average formula -continued

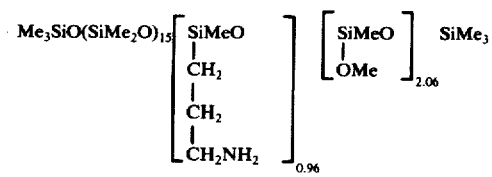

No silicon-bonded hydrogen could be detected in the product.

EXAMPLE 10

A mixture of 676 parts of a polysiloxane having the average formula $Me_3SiO(SiMe_2O)_{33.7}(SiMeHO)_{4.3}SiMe_3$, 600 parts of toluene and 0.149 part of bis(diethylsulphide) platinous chloride were heated to reflux and allylamine added dropwise to the stirred mixture. When 38 parts of allylamine had been added the mixture gelled. The addition of 8 parts of methanol rendered the gel liquid. An additional 16 parts of methanol were then added to the mixture which was heated to reflux for one hour after which solvent was removed by distillation at 100° C and 10 mm Hg to give 700 parts of a clear orange liquid having an equivalent weight of 1560 and represented by the average formula

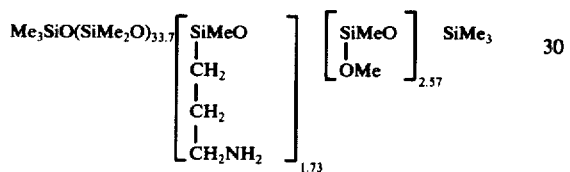

EXAMPLE 11

A mixture of 46.5 parts of a polysiloxane having the average formula $Me_3SiO(SiMe_2O)_{63.4}(SiMeHO)_{14.6}SiMe_3$, 38 parts of toluene and 0.01 part of bis(diethylsulphide) platinous chloride was heated to reflux and allylamine added slowly to the refluxing mixture. When 1.5 parts of allylamine had been added the mixture gelled. 3 parts of methanol were added in order to dissolve the gel, followed by an additional 4.2 parts of allylamine. When gas evolution ceased a mixture of 1 part of diethylhydroxylamine in 16 parts of methanol was added. The mixture was heated again until gas evolution ceased and volatile materials were removed by distillation at 100° C/10 mm Hg to give 46 parts of a liquid having a neutralisation equivalent of 2130 and represented by the average formula

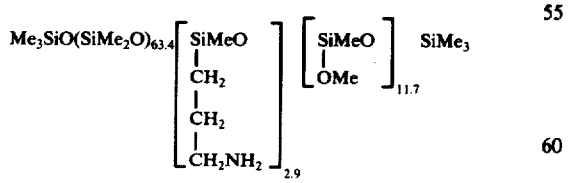

EXAMPLE 12

105 parts of the product of Example 1 and 82 parts of toluene were heated to reflux and a mixture of one part of stannous octoate, 8 parts of toluene and 15.2 parts of propylene glycol added thereto over a period of 5 minutes. The mixture was heated under reflux for two hours, during which time 0.173 part of hydrogen was evolved. (Theory: 0.182 part). The solution was filtered and devolatilised at 120° C and a pressure of 2 mm Hg to give 111.7 parts of a brown oil having a neutralisation equivalent of 1812 and represented by the formula

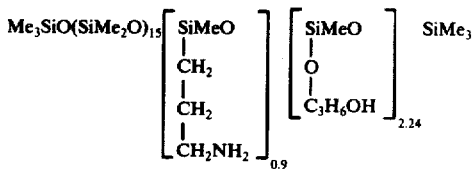

(Calc.neutralisation equivalent: 1823).

EXAMPLE 13

A mixture of 1200 parts of a polysiloxane having the average formula $Me_3SiO(SiMe_2O)_{44}(SiMeHO)_4SiMe_3$ and a viscosity of 51 cS at 25° C, 690 parts of toluene and 0.1 part of bis (diethylsulphide)platinous chloride was heated to reflux and 30.2 parts of allylamine added dropwise over a period of 2 hours. Volatile materials were removed by distillation at 120° C and 2 mm Hg pressure to give 1211 parts of a polysiloxane having a neutralisation equivalent of 3000 and a viscosity of 304 cS at 25° C. Quantitative infrared analysis showed that the product contained 42.2 percent of the silicon-bonded hydrogen present at the start of the reaction. The product was an organopolysiloxane containing the units $Me_3SiO_{1/2}$:$Me_2SiO$:$OSi(Me)CH_2CH_2CH_2NHSi(-Me)O$: $MeHSiO$:$OSi(Me)CH_2CH_2CH_2NH_2$: and $OSi(-Me)NHCH_2CH=CH_2$ in the proportions 1:22:0.503:0.85:0.073:0.017.

EXAMPLE 14

330 parts of the product of Example 13 and 170 parts of toluene was heated to reflux and a mixture of 2 parts of diethylhydroxylamine and 44 parts of methanol added thereto over a period of 30 minutes. Heating under reflux was continued for 6 hours after the addition was complete, by which time hydrogen evolution had ceased. A total of 0.28 part of hydrogen was evolved. (Theory: 0.306 part). The product was isolated by distillation at 130° C and 15 mm Hg pressure to give 336 parts of an oil having a neutralisation equivalent of 3140, and represented by the average formula

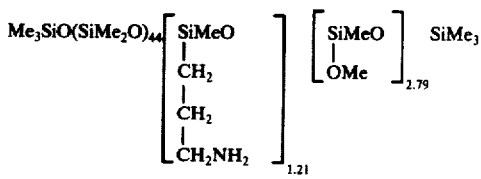

EXAMPLE 15

Nine liquid, non-abrasive solvent dispersion polishes were prepared by stirring for 10 minutes at 85° C and then allowing to cool, a mixture of 94.9 parts of mineral spirit, 2.0 parts of the product of one of Examples 5 to 12 and 14, 0.5 part of a trimethylsilyl-ended polydimethylsiloxane of viscosity 300 cS at 25° C, 0.2 part of tan soft microcrystalline wax, 0.1 part of filtered Carnauba wax and 2.3 parts of a synthetic Montan wax.

Each polish was found to impart a detergent resistant finish to a black nitrocellulose-lacquered panel. The polish films were unimpaired by 20 washes with a 1 percent solution of a commercially available car-wash detergent.

EXAMPLE 16

Three water based emulsion car polishes were prepared by heating to 85° C in separate vessels mixtures of
A. 1.2 parts of a trimethylsilyl-ended polydimethylsiloxane of viscosity 300 cS at 25° C, 3.0 parts of one of the products of Examples 5, 8 and 14, 2.8 parts of yellow No. 1 Carnauba wax, 6.6 parts of Paraffin wax having a melting point of 130°-135° F, 2.0 parts of oleic acid and 27.8 parts of mineral spirit, and
B. 1.4 parts of morpholine, 46.2 parts of water and 10.0 parts of a hydrophilic aluminium silicate; adding (B) slowly to (A) with continuous stirring, allowing the resulting mixtures to cool to 65° C and thereafter adding 5 parts of a 1 percent aqueous solution of "Viscofas" X100,000 with good stirring. The mixtures were stirred well for 5 minutes, homogenised and allowed to cool to 25° C to give liquid emulsion polishes.

All three polishes showed immediate resistance to washing with detergent solutions. The polish films were unimpaired by twenty washes with a 1 percent solution of a commercially available car-wash detergent.

EXAMPLE 17

Three oil-based emulsion car polishes were prepared by heating separately to 85° C mixtures of (A) 1.5 parts of a trimethylsilyl-ended polydimethylsiloxane having a viscosity of 100 cS at 25° C, 3.0 parts of one of the products of Examples 5, 8 and 14, 3.0 parts of Yellow No. 1 Canauba wax, 2.0 parts of a microcrystalline wax, 1.3 parts of a cationic emulsifying agent, 10 parts of an oleophilic aluminium silicate, 1.7 parts of an oxidised castor oil and 36 parts of mineral spirit, and (B) 41.4 parts of water containing 0.1 part of sodium nitrite; adding (B) to (A) with stirring, cooling to 60° C and homogenising. Thereafter the mixtures were allowed to cool slowly to 40° C and packed into chilled containers to give paste emulsion polishes. All three polishes showed immediate resistance to washing with detergent solutions.

EXAMPLE 18

252 parts of a siloxane having the average formula Me$_3$SiO(SiMe$_2$O)$_{15}$(SiMeHO)$_3$SiMe$_3$, and 400 parts of toluene were azeotroped to dryness and 0.1 part of chloroplatinic acid hexahydrate in 1 part of isopropanol added thereto. 11.4 parts of allylamine were added to the refluxing mixture during 2 hours. A sample of the solution was removed and on devolatilisation gave a gel, showing that crosslinking of the siloxane had occurred. Thereafter a mixture of 1 part of diethylhydroxylamine and 40 parts of isobutanol were added to the mixture during 1 hour and the mixture refluxed a further 1 hour and devolatilised.

Residual silanic hydrogen: zero
Amine equivalent: 1538.
The product had the average formula:

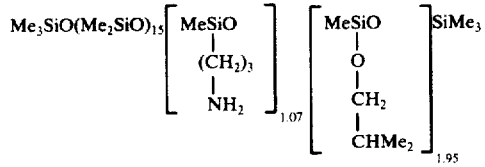

EXAMPLE 19

352 parts of a polysiloxane having the average formula Me$_3$SiO(SiMe$_2$O)$_{75}$(SiMeHO)$_3$SiMe$_3$ and 400 parts of toluene were azeotroped to dryness and 0.3 part of cyclohexane platinous chloride added thereto. 4 parts of allylamine were then added over a period of 2 hours. A small sample of the product withdrawn at this stage was devolatilised giving a gel which was found to have an amine equivalent of 5515. To the remainder of the solution was added 1 part of diethylhydroxylamine and 40 parts of isobutanol. The product was refluxed for 1 hour and devolatilised.

Residual silanic hydrogen: zero
Amine equivalent: 7144.
The product had the average formula:

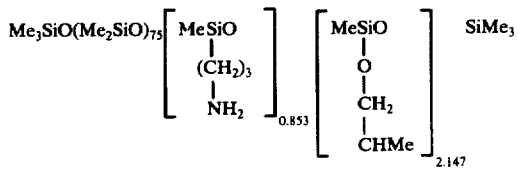

EXAMPLE 20

150 parts of a polysiloxane having the average formula Me$_3$SiO(Me$_2$SiO)$_{5.14}$(MeHSiO)$_{2.86}$SiMe$_3$, 86 parts of toluene and 0.02 part of bis(diethylsulphide) platinous chloride were heated to reflux and 63.5 parts of N-ethylallylamine added thereto during 2 hours. The mixture was subsequently heated under reflux for a further 2 hours and devolatilised to give 168 parts of a pale amber oil having the following analyses:

Residual silanic hydrogen: 2.5%
Amine equivalent: 403.5
Viscosity: 34 cS at 25° C The product contained the units Me$_3$SiO$_{1/2}$ : Me$_2$SiO: OSi(Me)C$_2$H$_4$CH$_2$N(Et)Si(Me)O : MeHSiO and OSi(Me)C$_2$H$_4$CH$_2$NHEt in the proportions 2:5.14:0.55:0.07:1.71.

92 parts of the above product in 47 parts of toluene were heated to reflux and 36 parts of methanol and 0.7 part of zinc octoate were added thereto. The mixture was heated under reflux for 2 hours, by which time hydrogen evolution had ceased. The solution was devolatilised to give 92 parts of a brown oil of:

Residual silanic hydrogen: zero
Amine equivalent: 409
Viscosity: 21.4 cS at 25° C.
This product had the average formula:

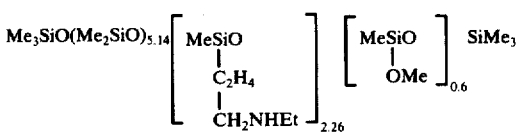

EXAMPLE 21

457 parts of a polysiloxane having the average formula $Me_3SiO(Me_2SiO)_{15}(MeHSiO)_{3.15}SiMe_3$, 347 parts of toluene and 0.4 part of a 10% solution of chloroplatinic acid hexahydrate were heated to reflux and 40.6 parts of N-ethylmethallylamine added during 1½ hours. A sample of the solution was devolatilised.

Amine equivalent: 1313
Residual silanic hydrogen: 56%

The product contained the units $Me_3SiO_{1/2}$ : $Me_2SiO$ : $OSi(Me)C_3H_6CH_2N(Et)Si(Me)O$ : MeHSiO and $OSi(Me)C_3H_6CH_2NHEt$ in the proportions 2:15:0.18:1.76:1.03.

185 parts of the so prepared solution was heated at reflux with 1 part of diethylhydroxylamine and 32 parts of isobutanol. 0.248 part of hydrogen was evolved. The mixture was devolatilised to give a brown oil of:

Viscosity: 18.8 cS at 25° C
Amine equivalent: 1418
Residual silican hydrogen: zero It had the average formula:

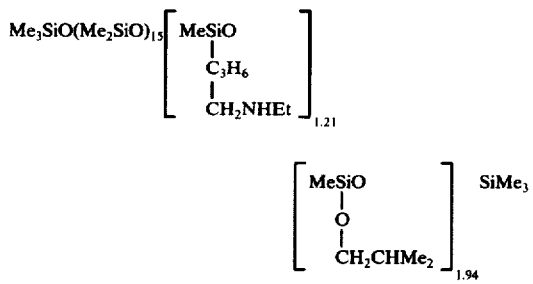

EXAMPLE 22

470 parts of a polysiloxane having the average formula $Me_3SiO(Me_2SiO)_{15}(MeHSiO)_3SiMe_3$, 334 parts of toluene and 0.04 part of bis(diethylsulphide) platinous chloride were heated at reflux and 23 parts of allylamine added thereto during 1¼ hours. Thereafter the solution was refluxed for a further three-quarter hour. 2 parts of zinc octoate dissolved in 2 parts of toluene were then added to the refluxing solution, followed by 3 parts of water added during 5 minutes. After the addition of water was complete the solution was heated at reflux until gas evolution ceased (1¾ hour), then 40 parts of isobutanol were added and the mixture again refluxed until gas evolution again ceased (2½ hours). The solution was cooled, filtered through 'Celite' and devolatilised to give 487.5 parts of a clear pale brown oil.

Amine equivalent: 1480
Residual silanic hydrogen: zero
Viscosity: 55.4 cS at 25° C
Residual silanol (Si—OH): zero It contains the groups $Me_3SiO_{1/2}$ : $Me_2SiO$ : $MeSiO_{3/2}$ : $MeSi(OCH_2CHMe_2)O$ and $MeSi(C_2H_4CH_2NH_2)O$ in the proportion 2:15:1:0.93:1.07.

What I claim is:

1. Organopolysiloxanes (A) consisting of 0.18 to 14 mole percent of units of the formula:

$$OSi(R)C_dH_{2d}CH_2N(R'")Si(R)O,\qquad (I)$$

0 to 0.1 mole percent of units of the formula:

$$OSi(R)NHCH_2C(R'")=CH_2 \qquad (II)$$

and 0 to 50 mole percent of units of the formula:

$$OSi(R)C_dH_{2d}CH_2NH(R'") \qquad (III)$$

the remaining units being selected from the group consisting of $R_3SiO_{1/2}$ and $R_eH_fSiO_{(4-e-f)/2}$ units where R is a monovalent hydrocarbon group, R'" is hydrogen or a methyl group, R$^{iv}$ is hydrogen or an alkyl group having up to 6 carbon atoms, d is 2 or 3, e is 1 or 2, f is 0 or 1 and e + f is 2.

2. Organopolysiloxanes according to claim 1 wherein the proportions of the units I, II and III are 5 to 10, 0 to 0.1 and 0.25 to 10 mole percent respectively.

3. Organopolysiloxanes according to claim 1 wherein R is selected from the group consisting of methyl, phenyl and 3,3,3-trifluoropropyl groups.

4. A process for the production of organopolysiloxanes (A) as claimed in claim 1 comprising reacting together in the presence of a catalyst selected from the group consisting of platinum metals and complexes thereof, an allylamine of the general formula $CH_2=C(R'")CH_2NHR^{iv}$ where R'" is hydrogen or a methyl group and R$^{iv}$ is hydrogen or an alkyl group having up to 6 carbon atoms and an organopolysiloxane of the average general formula $R_3SiO(RHSiO)_a(R_2SiO)_zSiR_3$ wherein R is a monovalent hydrocarbon group, a is a number from 1 to 50 and z is a number from 0 to 500.

5. The process of claim 4 wherein a has a value from 1 to 10 and z has a value from 0 to 100.

6. The process of claim 4 wherein the catalyst is used in amount from $10^{-3}$ to $10^{-5}$ moles per mole of SiH.

7. The process of claim 4 wherein the reaction is carried out by heating at from 30° to 200° C.

8. The process of claim 7 wherein a solvent is used and the reaction is effected by heating at the reflux temperature of the reaction mixture.

9. The process of claim 4 wherein the molar proportion of allylamine to silicon-bonded hydrogen is about 1:1 to 1:2.

10. The process of claim 4 wherein the catalyst is selected from the group consisting of bis(diethylsulphide)platinous chloride, chloroplatinic acid and platinum chloride/olefin complexes.

11. A process for the production of organosiloxanes having both aminopropyl or aminobutyl and OR' groups wherein R' is selected from the group consisting of hydrogen, monovalent hydrocarbon groups and oxyalkylene groups of the formula $(C_nH_{2n}O)_cR''$ comprising reacting a nitrogen-containing organopolysiloxane as claimed in claim 1 with a hydroxyl containing compound selected from the group consisting of water, methanol, ethanol, propanol, butanol, benzyl alcohol, ethylene glycol, propylene glycol and compounds of the formula $R''(OC_nH_{2n})_cOH$ where n is 2 or 3 and c is an integer from 1 to 30 and wherein R'' is selected from the group consisting of hydrogen and monovalent hydrocarbon groups.

12. The process of claim 11 wherein the product is free from silicon-bonded hydrogen.

13. The process of claim 11 wherein the reaction is carried out in the presence of a catalyst selected from the group consisting of piperidine, diethylhydroxylamine, potassium hydroxide, stannous octoate and zinc octoate.

14. Organopolysiloxanes produced by the process of claim 11.

15. Organopolysiloxanes having the average general formula:

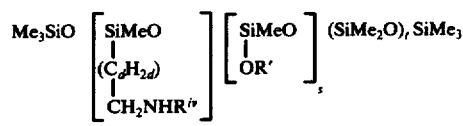

where R' is selected from the group consisting of hydrogen, monovalent hydrocarbon and polyoxyalkylene groups of the formula $(C_nH_{2n}O)_cR''$ wherein $n$ is 2 or 3, $R^{iv}$ is selected from hydrogen and alkyl groups having up to 6 carbon atoms, $c$ is an integer of 1 to 30, $d$ is 2 or 3 and $R''$ is selected from the group consisting of hydrogen and monovalent hydrocarbon, $r$ is a number from 0.1 to 5.0, $s$ is a number from 1 to 4.99 and $t$ is a number from 0 to 500.

16. Organopolysiloxanes of claim 14 wherein $r$ is from 0.7 to 2.0, $s$ is from 1 to 4.99 and $t$ is from 0 to 50.

* * * * *